UNITED STATES PATENT OFFICE.

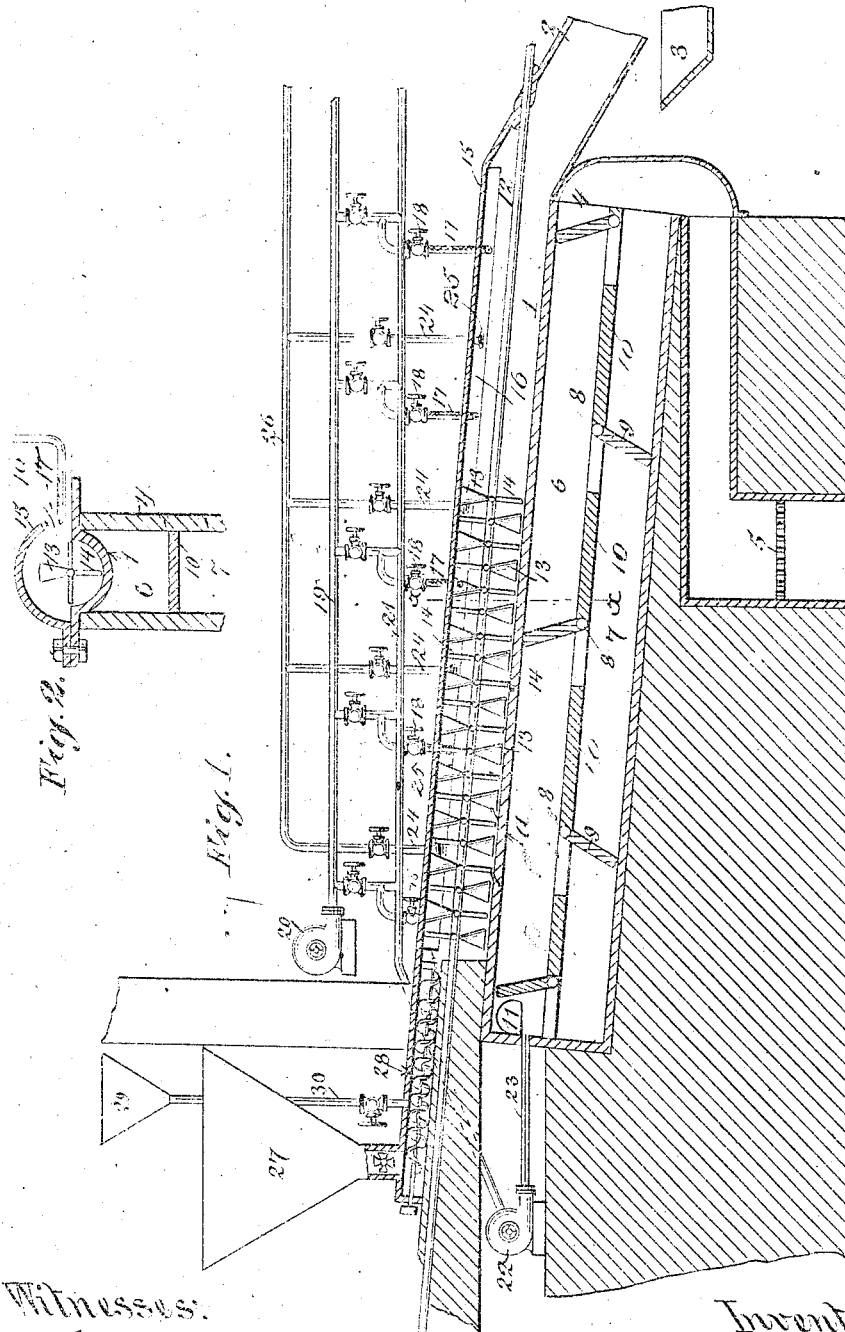

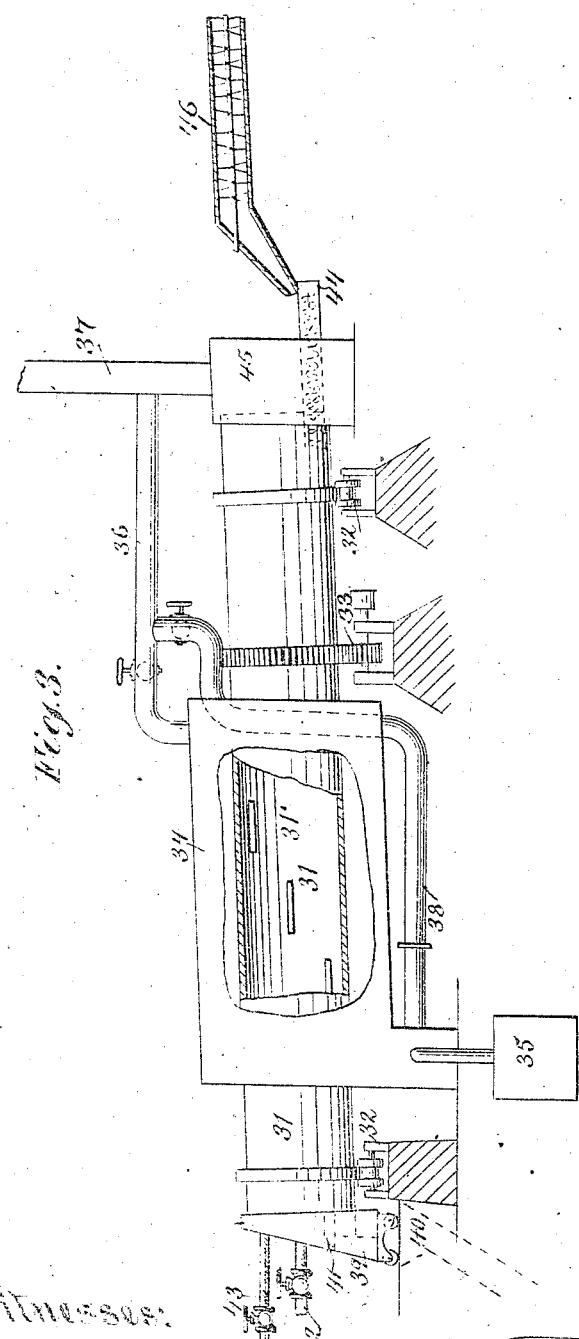
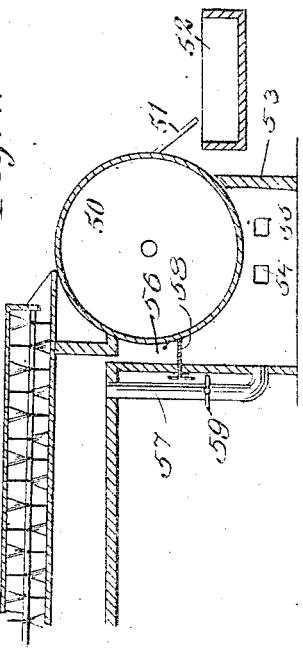

CARLETON ELLIS, OF LARCHMONT, NEW YORK, ASSIGNOR TO LIGNO CHEMICAL COMPANY, A CORPORATION OF NEW YORK.

MANUFACTURE OF OXALATES.

1,001,937.  Specification of Letters Patent.  Patented Aug. 29, 1911.

Application filed January 30, 1908. Serial No. 413,440.

*To all whom it may concern:*

Be it known that I, CARLETON ELLIS, a citizen of the United States, residing in Larchmont, in the county of Westchester and State of New York, have invented certain new and useful Improvements in the Manufacture of Oxalates; and I do hereby declare the following to be a full, clear, and exact description of the same, such as will enable others skilled in the art to which such improvements relate to practice and use the same.

This invention relates to improvements in the manufacture of oxalates, and comprises a process of making oxalates which includes the production of a traveling stream of oxalate-forming material and the treatment of such stream under varied thermal and other conditions at different points along its line of travel to produce oxalates; all as more fully hereinafter set forth and as claimed.

Various constituents of vegetables and vegetable tissues, such as the carbohydrates, lignin or "lignone", etc., upon treatment with caustic potash at temperatures above 100° C. undergo a progressive series of changes which, under proper conditions, finally result in the production of potassium oxalate together with other bodies. In the prior art this fact has been utilized in the production of oxalates, sawdust being impregnated with about twice its weight of caustic potash, or a mixture of caustic potash and caustic soda and the impregnated mass heated in open pans to temperatures around 390° F. In impregnation, in order to produce granular easily handled compositions, the alkalis are used in the form of very strong lyes; the lye being so strong that with the requisite amount of caustic the sawdust will be merely moist, not wet. In the subsequent heating of course much of the water of the lye is soon expelled. Potash is always employed, either alone or in admixture with some soda, it being believed in the art that soda alone will not answer. In the open-pan heating, in order to facilitate evenness of heating, which is of course a difficult matter with a granular mass like sawdust, stirrers of some type are usually employed. The stirring also has the function of promoting oxidation; an oxidation of the mass being desirable. As the heating progresses, the texture of the sawdust gradually disappears and the "melt" becomes more or less homogeneous.

The described discontinuous operation in which a charge of material is gradually heated up to a given point in free contact with air, though giving commercial yields requires much skill and the result of any given "melt" is rather uncertain. Violent and uncontrollable reactions are apt to set in and produce charred or burned masses containing but little oxalate. Though the oxalate-forming reaction is started by external heat, at one point in its development the action is exothermic and at this stage the temperature of the mass shows a tendency to rise above the danger limit of about 480° F. With the uncontrolled access of air, this tendency is of course heightened. The exothermic reaction appears to be a self-accelerating, self-propagating phenomenon. Dark colored spots appear in the mass and these rapidly spread until the whole mass may become charred. When the material is lumpy, the charring may begin at the very center of lumps, i. e., at the point farthest removed from the external heating, and spread outwardly so that lumps which at one moment have a satisfactory appearance in the next may appear charred or browned. From one lump the action will spread to another. If, to avoid this dangerous reaction, temperatures be kept rather low the melt is apt to develop acetates and other salts rather than oxalates, particularly if oxidation be limited, and to form undue amounts of humous bodies which embarrass the subsequent recovery of crystalline oxalates. Normally, ordinary sawdust when mixed with alkali and gently heated should form a reddish brown mass which gradually lightens in color as the temperature rises to about 350° F., ultimately forming a light yellow, easily leached, comparatively pure product. With excessive temperatures, such as those produced in the spontaneous rise described, the mass becomes dark or even jet black and contains little or no oxalate while with low temperatures the mass is also dark from the presence of humous bodies and may contain relatively little oxalate, and that in an impure condition. It is obvious that in this operation great skill, care and experience on the part of the operator are required. The necessity, or presumed necessity, for the use of potash is also a drawback in many cases, potash being relatively expensive as compared with soda. Potash is not, as a matter of fact, absolutely necessary though it is often convenient since its presence serves to facilitate the oxalate-forming reactions and thereby tends to counteract to some extent the uncertainty of the described operation. The danger of spontaneous overheating is not so great with potash as with soda.

It is the object of the present invention to provide a simple, cheap and ready method of forming oxalates which shall be free from the disadvantages of the older methods and shall have certain new and valuable advantages, giving enhanced yields with a simpler, surer and less laborious operation.

In the formation of oxalates by heating alkalized woody fiber constituents the action tends to take place in a plurality of successive stages, each, for the best work, requiring special conditions of time, temperature, oxidation, etc., and it is found that better yields, greater certainty of operation and much enhanced economy of time, labor and skill are secured by performing these several stages severally and successively, each under the conditions best adapted thereto, in lieu of attempting to perform them all simultaneously, as must be the case in heating the material in bulk in uniformly heated apparatus, since in such bulk heating different portions of the mass are undergoing different reactions at the same time. To this end, the material is heated and treated in the form of a thin traveling stream, or successive small portions; such stream at successive points in its travel being exposed to different thermal and other conditions, such conditions at each point being those best adapted to the particular stage of the action which such material is undergoing at such point.

Apparently the first action of the alkali upon woody fiber, when sawdust and like materials are used, is to convert various of the constituents of the fiber into alkali compounds which then break down into simpler substances, ultimately becoming salts of various organic acids. In this analytical action, absorption of oxygen is apparently of considerable importance. These salts on further reaction break down into oxalates. The oxalates so produced are, however, themselves oxidizable and are also sensitive to undue heat, easily breaking down into carbonates. The frequent destruction of the oxalate in the uncontrolled operations of the prior art is therefore easily explainable.

It is found that the access of air to the material should be controlled and should be varied at different stages in the operation. It is also found that it is desirable that the moisture content of the material should be under control. As stated, in the process of the prior art, the moisture of the lye originally employed for impregnation rapidly evaporates as the material is heated so that, in the first stages, the woody fiber is exposed to the action of lye of steadily increasing strength. It much conduces to the regularity and smoothness of the oxalate formation if this moisture be replaced, at least in part, by regulated additions of moisture to the traveling stream of material under treatment; such additions having the further utility of helping to repress the tendency toward the spontaneous rise of temperature to dangerous heights.

With the perfect control of conditions afforded in the present invention, the use of potash may be dispensed with and soda used as the only alkali. Potash may, however, also be employed. As stated, it facilitates the oxalate-forming reaction materially. The proportion of alkali to woody fiber constituents is not a matter of indifference. The higher the proportion of alkali, the less danger appears of the spontaneous overheating and the freer is the resultant product of humous bodies and other impurities. Low proportions of alkali while frequently giving excellent oxalate yields give impure reaction products. As a rule, the use of about two parts of alkali for every part of woody fiber constituents will give a good product; particularly where the alkali is potash or contains potash. Larger proportions are frequently better; particularly with soda alone. Much elasticity as to ratio of alkali to organic material is, however, permitted by the perfect control of conditions afforded in the present method.

In the accompanying drawings are shown, more or less diagrammatically, sundry of the many types of apparatus adapted for use in the present process.

In this showing: Figure 1 is a view, partly in longitudinal vertical section and partly in elevation, of one type of apparatus; Fig. 2 is a view in vertical cross section of the same apparatus, the view being taken at line $x$—$x$ of Fig. 1; Fig. 3 is a view, partly in longitudinal vertical section and partly in elevation, of another form of apparatus which may be used in conjunction with, or to replace, apparatus of the type of that shown in Fig. 1: and Fig. 4 is a similar view of still another form, which may also be used in conjunction with, or to replace, the structure of Fig. 1.

Taking first Figs. 1 and 2, element 1 is a long horizontal trough or conduit, provided at its lower end with a discharge conduit 2 which may take material to another apparatus (as hereinafter described) or deposit it in a vessel 3, which may contain water. This trough or conduit is provided with means for heating it, which may be, as shown, a flue 4 for flame gases. Such flame gases may be provided, as shown, by a grate-furnace 5. It being desirable to differentially heat different sections of the conduit, or omit heating altogether in certain other sections wherein exothermic reactions are taking place, the flue as shown is provided with means for such differential heating. While separate heating means, such as gas jets, might be used for different sections, the means shown are simple and well adapted for large-scale work. As shown, the flue is converted into a pair of sub-flues 6 and 7 by means of an intermediate partition or septum 8. This septum, as shown, is composed of a series of pivoted damper plates 9 with intermediate fixed plates, 10. With all the damper plates in horizontal position, the normal flow of fire gases is through the upper sub-flue, while by suitable manipulation of such damper plates the fire-gases may be by-passed through any desired portion of the lower sub-flue. As shown, the damper plates may be swung to close either the upper or the lower sub-flue, or may rest in an intermediate position to form the described septum. It is ordinarily desirable to heat both ends of the conduit, for reasons later stated, and leave an intermediate section more or less unheated, and the damper plates are shown arranged to secure this. At the upper end of the flues fire-gases exit through flue 11 leading to a stack.

The relative lengths of the heated and unheated zones will depend upon the particular mixture under treatment and its observed tendency toward an exothermic action with development of undue heat. With a mixture containing a large amount of potash as compared to the amount of woody fiber, there is but little of this tendency and the unheated zone need be but short, but on increasing the amount of woody fiber or increasing the amount of soda, the development of heat is greater and a longer unheated zone with positive means for cooling become necessary. With the dampers set as shown in the accompanying illustration, the relative lengths of heated and unheated zones are adapted to the treatment of a mixture comprising much soda, as a mixture of soda waste lye and Peruvian bark refuse.

As shown, the conduit is slightly inclined to facilitate progress of material therethrough. It is also provided with a conveyer mechanism 12. This conveyer may be provided with alternate conveyer blades, 13, shaped like a segment of a helix, and cutter or knife bars, 14. The lower portion of the conveyer shaft is shown without blades to permit clear illustration of certain pipe connections, but in practice it is provided with such blades throughout its length. Above the conduit (see Fig. 2) is an arched cover 15 to prevent free and unrestricted access of air, having a longitudinal opening 16 at one side to permit manipulation of the traveling stream of material. Near this opening at various convenient points are mounted a series of jet pipes 17, conveniently made of flexible material and valved at 18. Each of these pipes communicates with a pipe 19, leading from an air fan 20, and with a pipe 21, leading from a fan 22 connected to a pipe 23 tapped into the flue under the conduit whereby products of combustion may be withdrawn for a purpose later described. Another series of pipes or hose, 24, provided with spray nozzles 25, are connected to a water pipe 26.

Solid material, as sawdust, is fed to the conduit from hopper 27 by means of mixer and conveyer 28. Liquid material, as lye, is fed to the solid material in the mixer from vat 29 by means of pipe 30.

In the structure of Fig. 3, 31 is an inclined cylindrical drum, having internal lifting vanes 31' mounted to rotate on bearings 32 and driven by gearing 33. A heating housing 34 encircles a portion of the drum, this housing being heated by producer gas from producer 35, or by any other suitable means. Flue 36 withdraws products of combustion from the housing and directs them to chimney stack 37. A valved by-pass flue 38 near the bottom of the housing provides means for diverting flame gases, or a portion of them, without contacting with the drum. This by-pass flue may be likewise connected to the stack. At the lower end of the drum is a stationary header or hood 39, engaging the lower end of the rotary drum and similar in structure to the hoods used with rotary cement kilns, provided with a discharge conduit 40 for finished material and sight holes 41. Pipes 42 and 43, provide respectively for introduction of air or products of combustion, or both together, and for introduction of steam or sprayed water. They are, as shown, preferably made flexible. At its upper end, the kiln or drum is provided with a conveyer 44 for introducing material, passing through the base or dust chamber 45 of the chimney stack. The conveyer receives material from trough 46, which may be a mere mixing device or a structure analogous to that of Figs. 1 and 2. The lower end of the cylinder being nearer the heat is much hotter than the upper where the comparatively cold material is introduced, and the material is exposed to a graduation of temperature during its downward flow.

In the structure of Fig. 4, 50 is a suitably heated revolving drum, provided with doctor 51, scraping off material and discharging into vessel 52, which may contain water. The drum revolves over a heating chamber 53, provided (as shown) with air and producer gas inlets, respectively 54 and 55, and having a double discharge for hot products of combustion, one flue, 56, passing up in contact with the side of the drum and another 57 by-passing said side. Suitable dampers 58 and 59 regulate the amount of flame contacting with the drum. At their upper end, both flues discharge into a heating chamber under a conduit substantially like that of Fig. 1, but here shown only fragmentarily.

In the use of the structure of Fig. 1, the solid raw material, such as sawdust, is fed into the mixer 28 from hopper 27 and liquid material, such as lye, added through pipe 30. The conduit for a capacity of 200 to 400 pounds of material per hour may be 50 to 60 feet long and arranged to handle such material in a traveling layer of 3 or 4 inches in depth. With a greater thickness of layer it is difficult to maintain the thermal conditions right without a rapidly acting stirrer. The liquid and solid are thoroughly intermixed in the mixer, their relative proportions being preferably so adjusted that the mixture emerges in a damp but not pasty condition into the conduit 1. With the dampers set as shown, the upper end and lower end of the conduit are heated while a midportion is left unheated. The extent which shall be heated and which shall be left unheated will depend upon the particular mixture treated and whether the oxalate formation is finished in the conduit or elsewhere. When completed in the apparatus shown and using caustic soda lye with sawdust, the unheated zone should be comparatively long; particularly with low proportions of alkali. In the heated zone, marked $a$, the mixture is heated and brought up to a temperature of about 350° F. As moisture rapidly evaporates and the mixture tends to become too dry, with resultant undue concentration of the lye in the sawdust, some moisture should be added from the water spray. The evaporating moisture and the presence of the hood 15 shield the surface of the stream of material from direct contact with air. As some oxidation is, however, desirable this is furnished by the jet nozzles which are so arranged that an impinging jet of air can be needled through the vapor overlying the stream. The amount of this air, and consequently the oxidation, are obviously under the perfect control of the attendant. The provision of the supply of products of combustion enables such attendant to dilute the air to any desired extent. The products of combustion contain much $CO_2$ and this is helpful at this point in carbonating a portion of the excess of caustic soda.

As the material nears the stated temperature, a tendency toward exothermic action sets in and at this stage the use of external heat may become unnecessary or undesirable, and the dampers are set accordingly, the water spray and the products of combustion and air jet being used to maintain the temperature at a desired point. The water acts both by diluting or weakening the lye in the mixture and by its sheer chilling effect, while the air has a heating action, since it promotes oxidation. After the exothermic action has run its course, the material is again subjected to external heat to re-institute the normal course of reactions, and to oxidize and destroy the humous and coloring bodies. Here again the water spray and air and products of combustion may again be used to control and make normal the actions in the traveling stream of material. At this point, the products of combustion are particularly useful for several reasons, one being that the presence of $CO_2$ in the circumambient atmosphere tends to repress destruction of oxalate by heat and oxygen, and another being that excess of caustic soda is carbonated and its combinations with humous and coloring matter are broken up, so that it is safer to use comparatively high heats in finishing. There is a tendency for other exothermic reactions, probably partly due to oxidation, partly due to internal changes, to take place in the finishing and the means of control described are very useful here. If there is too much moisture in the mixture at any stage, the hot products of combustion can be used to carry it off. By proper conjoint use of water spray, air and hot products of combustion, the amount of moisture in the material, the temperature and the oxidation can all be easily controlled. As the mass nears 450° F., it occasionally is apt to undergo a spontaneous decomposition, rising 25° to 50° and more in the case of sawdust. With Peruvian bark refuse, which is more reactive than ordinary sawdust, the temperature may go up 150° to 250°, the mass intumescing violently to give a light colored melt free from humic acid bodies and coloring matters, and also free from oxalates. A spoiled melt from sawdust is apt to be dark brown or black and contain much humus.

The material discharged from the conduit may be received in a body of water, or it may be further heated and treated elsewhere. When subjecting to further treatment elsewhere, it is frequently advisable to push the feed and regulate the heating and other conditions so that the material will reach the end of the conduit about the time the described first exothermic action tends to set in, or after it has run its course somewhat under control of the spray and jets. It will then be discharged in the form of small lumps or balls, which are often, with sawdust and alkali, about the size of beans. These are free of fiber. The granular mass, after some cooling, can be ground to powder and reheated and will then oxidize and convert regularly. This is a very efficient means of attaining a good destruction of coloring bodies. The original heating has done away with much of the tendency to exothermic reactions and irregularity. The material however need not be cooled and ground. If the exothermic reaction has been allowed to run its course, the material may simply be rapidly heated as on the roller of Fig. 4, or slowly heated for a comparatively long period of time, as in the drum of Fig. 3. Much of course depends on the particular mixture under treatment and its tendency to yield humous bodies.

With easily reacting mixtures, or with mixtures which have been partially converted elsewhere, the inclined cylinder of Fig. 3 is useful. The material enters this at its upper end and slowly travels downward in the form of a stream resting on the bottom and lower ascending quadrant, its particular position of course depending on the feed, the speed of rotation and the inclination of the drum. The lifting vanes shown of course operate to tumble this stream somewhat and promote its contact with the atmosphere within the cylinder. The composition of this atmosphere may be adjusted by proper use of the jets of products of combustion, air and steam. By the use of regulated amounts of steam, the tendency toward evaporation in the material can be regulated and its moisture content adjusted. The caustic alkalis are of course hygroscopic, even at high temperatures. The amount of air admitted, and the consequent oxidation, are of course easily regulated. Heat is furnished by the external heating jacket surrounding the drum and controlled both by regulating the heating means shown and by the amount of steam and gases introduced. The time of exposure to this heat, or the "time-contact" factor, is adjusted by adjusting the speed of the drum and the feed of material.

The structure of Fig. 4 is particularly useful with easily reacting mixtures. In this view, the conduit is shown broken away and as discharging on a heated drum. The material, which is more or less plastic and adhesive, travels forward on the drum as a thin layer well exposed to the air and is ultimately scraped off by the doctor and discharged into a body of water or other suitable cooling means.

The particular material treated is by no means a matter of indifference. While many vegetable materials are adapted to form oxalate in remunerative quantity, the treatment best adapted to each varies materially. Pure cellulose reacts with alkali to form oxalates, but its yield is not so great as in the case of woody fiber, containing, or composed of, the so-called "lignin" or "lignone." The molecular complex of the tissues of many woods is composed of about equal parts of cellulose and lignone, and it is probable that in the case of sawdust most of the yield is frequently due to the lignone. In paper making methods, as with soda lye and with acid sulfites, the cellulose is isolated while the solvents dissolve and carry away the lignone. The solutions formed are well adapted for the present purpose. Sundry other fibers, like jute, appear to be composed largely of lignone bodies, and are well adapted to the present purposes. Barks contain more lignone than cellulose and are very well adapted. Extracted vegetable materials, like the residues left after extraction of quinin, etc., from Peruvian bark; after extracting tannin and dyestuffs from woods and barks, gall nuts, etc., and even the bagasse left after extracting sugar from various materials, all appear especially advantageous in the manufacture of oxalate; possibly because they are left open and porous in extraction, because they contain large amounts of lignone, because they are generally somewhat oxidized and altered in the extraction processes, and because, perhaps, they have been freed of soluble, non-oxalate-yielding bodies which would form humus and impurities. Light wood chips and refuse left after extracting turpentine are also suitable. It is with materials of the character of these extracted refuses that my process is particularly advantageous since they are apt to react quickly and violently with the alkali.

The alkali employed may be either soda or potash, or both. Some lime may also be used in conjunction with the more soluble alkalis. Potash though expensive and not necessary, as stated, is still often convenient as it facilitates reactions and permits quicker work. With 20 to 30 per cent. of potash in the alkali, the operation is much quicker permitting a given apparatus to turn out more oxalate in a time unit. The potash employed can all be recovered in subsequent leaching operations and separated from the soda. Soda alone however does very well. Melts containing it are apt to exhibit more of the exothermic reactions, but these can be well controlled in the present method. As a particularly convenient and suitable source of alkali, I regard the stated waste soda lye from paper mills. This contains much lignone dissolved from the wood employed to form pulp, and, under suitable conditions, this lignone is readily converted into oxalate. While it may be treated alone, its physical form as it appears coming from the evaporators, that of a heavy syrup or plastic masse-cuite, renders it advisable to add granulating bodies to it. It may be taken up in sawdust, spent bark, absorbent woods, sand, etc., and thereby rendered granular. Or it may be treated with lime, or with caustic soda, or caustic potash. Caustic alkalis precipitate out the organic bodies in coagulated form. Addition of more alkali to the material is furthermore frequently useful since it contains organic matter in such a high ratio to alkali as to give a tendency toward production of impure melts and the development of violent exothermic reactions.

A useful mixture employing waste soda lye is made by adding 200 parts of caustic soda solution of 1.42 sp. g. to 200 parts of soda waste lye of 37° Baumé and 35 parts of sawdust or waste residues from Peruvian bark. The soda solution precipitates and flocculates the organic matters of the lye upon the sawdust and the mixture forms a pasty mass, readily treated by the described process. At temperatures between 212° and 265° F., the bulk of the water evaporates and the mass becomes nodular, the granules being pea-sized. Gradually raising the temperature to about 360° F., the mass becomes lighter colored and at 440° F. a disposition to exothermic action sets in which must be repressed with the water spray.

A mixture of 25 parts powdered caustic soda and 100 parts waste soda lye of 38° B. forms a rather doughy mass, the lignone combinations separating as the caustic dissolves. This mass may be heated as such, but it is preferable to make it more granular by the use of sawdust, sand, whiting, lime or other granulating body.

A mixture which works very well is made by the use of 200 parts of 38° B. soda lye, 50 parts sawdust sifted through a 50 mesh sieve, 200 parts of 49 per cent. caustic soda solution, 10 parts of Peruvian bark refuse and 120 parts of caustic potash. As produced in mixer 28, this forms a very thick, non-sticky paste. A little sand, whiting or granulated coke makes it more granular, but is not necessary with good work. As this mixture passes down the conduit and over the first heated section, the water begins to evaporate and the mass becomes granular. Using a small amount of impinging air and the water spray, the evaporation-loss is restrained, keeping the mass in good condition and a fairly regular oxidation secured. As the temperature reaches 350° or thereabout, use of external heat on the traveling stream is omitted and after the bulk of the exothermic reaction has taken place heating is again resumed, the mass being finally discharged at about 400°—450°, cooled and leached. With a rapid flow of material down the conduit and low heat beneath it, the point at which the exothermic action tends to set in may be pushed down to the end of the conduit, and the material there discharged for cooling and grinding, or for treatment on the drum or in the rotating cylinder. As the material passes down the conduit, local developments of the exothermic reaction, as evinced by local changes in color, should be restrained by use of the water spray. If the impinging air jet at any point appears to cause too rapid oxidation, the air should be diluted with products of combustion to a greater or less extent. If the mass appears too moist at any point, the excess of moisture may be carried off by a free use of air or products of combustion.

Another good mixture of materials is made by using 200 parts of 37° B. soda waste lye, 25 parts sawdust sifted through a 20 mesh sieve, 300 parts sand, 320 parts of 50 per cent. caustic soda solution and 100 parts of 40 per cent. caustic potash solution. Still another may be made by taking 100 parts sifted pine sawdust and 550 parts lye of sp. g. 1.45, containing potash and soda in the ratio of 1:2. This mix is easily handled and, treated as described, gives a light colored reaction product running high in oxalates. The temperature throughout may be maintained at about 400° F. without difficulty and without danger by the use of the described expedients. The high ratio of total alkali to sawdust (about 2.5 to 1) and the presence of potash make the reactions unusually susceptible of control. Substitution of Peruvian bark waste for sawdust tends to make the reactions more energetic.

I have noticed that with many of these mixtures, the exothermic action instead of being controlled may be anticipated. By heating the granulated material at a controlled heat of about 350° till the fiber disappears and the granulated mass is amorphous, and then very rapidly raising the heat with full exposure to air, the granules swell up and turn white in a few seconds. If the heat be maintained they will then char, but if they are at once cooled, as by plunging into water, they will remain light and will give a mass high in oxalate and almost free from humus. This operation may be performed in the apparatus of Fig. 1, the jets at the bottom end of the conduit being fed with pure, or almost pure, air in large quantity. Or, and preferably, the feed and heating may be so managed in the conduit as to deliver the material at the end at about 350° and such material at once highly heated on the rotating drum of Fig. 4, being scraped off and cooled, as by dropping into a tank of water, just before the material begins to redarken. The drum gives the necessary high, quick heating and the full exposure to air.

In the described method, the continued use of the steam or water-spray so as to keep the traveling mass of adjusted moisture, of, say, 10 per cent. on the average, content during its progress, aside from its utility in regulating the normal reactions, causes the mass to assume a rather peculiar, easily handled consistency. Sawdust and caustic soda (50 parts sawdust to 100 NaOH), traveling down the heated conduit under constant moistening after reaching about 350°-370° become converted into a mass of a consistency which may be described as cheesy, or, perhaps, rather as a mass of somewhat doughy consistency, composed of small lumps, or plastic crumbs, which do not stick together but can be readily stirred and moved past each other. This plastic yet non-cohering consistency is excellently well adapted for the use of stirring machinery, as for instance, the use of the conveyer shown in Fig. 1 and enables a good, easily handled and maintained stream of material to be passed down the conduit of Fig. 1, or the cylinder of Fig. 3.

High proportions of caustic soda alone appear to work as smoothly as less proportions of soda plus potash. A mixture of 150 parts caustic soda lye of 1.5 sp. g., equaling 112 parts of NaOH, with 50 parts sawdust gives results as good as the use of 75-100 parts of potash or potash and soda mixed. Low proportions of soda alone may be used, as in treating soda waste lye mixed with inert granulating materials, but more care and precautions are required and the resulting melt is frequently quite impure. Soda waste lye sometimes runs as high as 3 parts organic matter to 1 of NaOH, though this organic matter having been hydrolyzed extensively in soda pulp making is equivalent to much less ordinary woody fiber material.

Where lime is used as a component of the mix, the product contains much or all of its oxalate as insoluble calcium oxalate. With soda alone, it is of course present as sodium oxalate. Using mixtures of potash and soda and forming concentrated solutions or leachings derived from the melt, most or all the oxalate may be converted into sodium oxalate which crystallizes out, while the potash remains in solution and may be recovered.

What I claim is:—

1. In the manufacture of oxalates, the process which comprises passing oxalate-forming materials as a progressively moving stream or layer through a succession of zones maintained under different thermal conditions, the conditions in each such zone being adjusted to the temporary thermal needs of the stream of material at the time of passing through such zone.

2. In the manufacture of oxalates, the process which comprises producing a continuously moving body or stream of material comprising alkali and woody fiber constituents, passing such stream through a heated zone maintained at oxalate-forming temperatures, and shielding such stream against free access of atmospheric air while impinging regulated jets of air upon portions of such stream.

3. In the manufacture of oxalates, the process which comprises producing a continuously moving body or stream of material comprising alkali and woody fiber constituents, passing such stream through a heated zone maintained at oxalate-forming temperatures, and shielding such stream against free access of atmospheric air while impinging regulated jets of air upon portions of such stream, such jets containing regulated amounts of oxygen.

4. In the manufacture of oxalates, the process which comprises producing a continuously moving body or thin stream of material comprising alkali and woody fiber constituents and passing such stream through a heated zone maintained at oxalate-forming temperatures and at differential temperatures in different parts of such zone while exposing such stream to regulated oxidation.

5. In the manufacture of oxalates, the process which comprises heating a mass of material comprising alkali and woody fiber constituents to an oxalate forming temperature, and maintaining it at such temperature until the conversion into oxalate is complete and supplying liquid moisture thereto during the heating.

6. In the manufacture of oxalates, the process which comprises heating a body of material comprising alkali and woody fiber constituents to an oxalate-forming temperature, and maintaining it at such temperature until the conversion into oxalate is complete, and repressing and controlling the temporary development of exothermic reactions therein by additions of moisture at the time of and during such development.

7. In the manufacture of oxalates, the process which comprises heating a body of material comprising alkali and woody fiber constituents to an oxalate-forming temperature and maintaining it at such temperature until the conversion into oxalate is complete and supplying additional moisture thereto from time to time during such heating.

8. In the manufacture of oxalates, the process which comprises heating a body of material comprising alkali and woody fiber constituents to an oxalate-forming temperature with partial exclusion of atmospheric air and under conditions of regulated oxidation while supplying liquid moisture thereto from time to time.

9. In the manufacture of oxalates, the process which comprises producing a continuously moving body or stream of material comprising alkali and woody fiber contituents and passing such stream through a heated zone maintained at oxalate-forming temperatures while supplying liquid moisture thereto from time to time.

10. In the manufacture of oxalates, the process which comprises producing a continuously moving body or stream of material comprising alkali and woody fiber contituents and passing such stream through a heated zone maintained at oxalate-forming temperatures, repressing localized tendencies to exothermic reactions by additions of liquid moisture at the point of such tendency.

11. In the manufacture of oxalates, the process which comprises producing a continuously moving body or stream of material comprising alkali and woody fiber contituents and passing such stream through a heated zone maintained at oxalate-forming temperatures while adding moisture to such stream at a plurality of points along its progress.

12. In the manufacture of oxalates, the process which comprises producing a continuously moving body or stream of material comprising alkali and woody fiber contituents and passing such stream through a heated zone maintained at different temperatures at different points in the progress of such stream, such zone being maintained hotter at an initial point and at a final point than at an intermediate point in the progress of such stream.

13. In the manufacture of oxalates, the process which comprises producing a continuously moving body or stream of material comprising alkali and woody fiber contituents and passing such stream successively past a surface maintained at a high oxalate-forming temperature, a surface of less heat and finally past another surface of higher temperature than such first surface.

14. In the manufacture of oxalates, the process which comprises producing a continuously moving body or stream of material comprising alkali and woody fiber contituents, passing such stream over surfaces having different temperatures at different points in the progress of the stream and finally over a relatively hotter surface under conditions of free oxidation, the material being removed from such final surface and cooled just prior to commencement of charring.

15. In the manufacture of oxalates, the process which comprises raising a body of material comprising alkali and woody fiber to a temperature of about 350° F., transferring such body to a heated surface of much higher temperature under conditions of free oxidation, and quickly removing and cooling such body just prior to commencement of charring.

16. In the manufacture of oxalates, the process which comprises producing a continuously moving body or stream of material comprising alkali and woody-fiber constituents, passing such stream through a heated zone maintained at oxalate-forming temperatures and of different temperatures at different points along the progress of such stream, an initial and a final point being of higher temperature than an intermediate point, shielding such stream from free access of air during at least a portion of its progress while permitting a regulated oxidation in such stream by impinging jets of air at different points, each such jet being of controlled composition, adding moisture to such stream at different points along its progress and at a final point in its progress permitting freer oxidation than at prior points.

17. In the manufacture of oxalates, the process which comprises heating a mass comprising soda waste lye to an oxalate-forming temperature under oxalate-forming conditions and maintaining said mass as a continuously moving body or stream during the reaction.

18. In the manufacture of oxalates, the process which comprises heating a mass comprising soda waste lye and extracted vegetable material to an oxalate-forming temperature under oxalate forming conditions.

19. In the manufacture of oxalates, the process which comprises heating a mass comprising soda waste lye and extracted Peruvian bark residues to an oxalate-forming temperature under oxalate-forming conditions.

20. In the manufacture of oxalates, the process which comprises heating a mass comprising an alkali and extracted Peruvian bark residues to an oxalate-forming temperature under oxalate-forming conditions.

21. In the manufacture of oxalates, the process which comprises heating a mass comprising soda and extracted Peruvian bark residues to an oxalate-forming temperature under oxalate-forming conditions.

22. In the manufacture of oxalates, the process which comprises heating a mass comprising soda waste lye, additional alkali, and woody fiber to an oxalate-forming temperature under oxalate-forming conditions.

23. In the manufacture of oxalates, the process which comprises heating a mass comprising soda waste lye, additional alkali and extracted vegetable material to an oxalate-forming temperature under oxalate-forming conditions.

24. In the manufacture of oxalates, the process which comprises heating a mass comprising soda waste lye, additional alkali and extracted Peruvian bark residues to an oxalate-forming temperature under oxalate-forming conditions.

25. In the manufacture of oxalates, the process which comprises producing a continuously moving body or stream of material comprising soda waste lye, additional alkali and woody fiber passing such stream through a heated zone maintained at oxalate-forming temperatures and of different temperatures at different points along the progress of such stream, an initial and a final point being of higher temperature than an intermediate, shielding such stream from free access of atmospheric air during at least a portion of its progress while permitting a regulated oxidation in such stream by impinging jets of air at different points, such jet air being of controlled composition, adding moisture to such stream at different points along its progress and at a final point in its progress permitting freer oxidation than at intermediate points.

26. The process of forming oxalates which comprises heating a mass of material comprising alkali and woody fiber constituents to an oxalate-forming temperature and maintaining it at such temperature until the conversion into oxalate is complete, liquid moisture being added to the mass from time to time during such conversion in amount sufficient to maintain the mass in a plastic condition.

In testimony whereof, I affix my signature in the presence of two witnesses.

CARLETON ELLIS.

Witnesses:
NATHANIEL L. FOSTER,
HENRIETTA BERKURTZ.